(12) United States Patent
Huang et al.

(10) Patent No.: US 8,722,815 B2
(45) Date of Patent: May 13, 2014

(54) TWO-COMPONENT MOISTURE CURABLE COATING COMPOSITIONS

(75) Inventors: Yan Huang, Shanghai (CN); Hongyu Chen, Shanghai (CN); John Roper, III, Midland, MI (US); Christopher Tucker, Midland, MI (US); Gerald Vandezande, Raleigh, NC (US); Yanxiang Li, Midland, MI (US); Yu Zhang, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 117 days.

(21) Appl. No.: 13/451,604

(22) Filed: Apr. 20, 2012

(65) Prior Publication Data

US 2012/0269977 A1    Oct. 25, 2012

(30) Foreign Application Priority Data

Apr. 25, 2011   (CN) .......................... 2011 1 0115941

(51) Int. Cl.
*C08G 77/16*     (2006.01)

(52) U.S. Cl.
USPC ........................................... 525/477

(58) Field of Classification Search
USPC ........................................... 525/477
See application file for complete search history.

(56) References Cited

U.S. PATENT DOCUMENTS

| | | | |
|---|---|---|---|
| 4,910,252 | A | 3/1990 | Yonehara et al. |
| 5,691,019 | A | 11/1997 | Carroll et al. |
| 6,071,990 | A | 6/2000 | Yip et al. |
| 6,313,335 | B1 | 11/2001 | Roberts et al. |
| 6,485,838 | B1 | 11/2002 | Shimada et al. |
| 7,244,797 | B2 | 7/2007 | Kurihara et al. |
| 2005/0011942 | A1 | 1/2005 | Adachi |
| 2005/0119421 | A1 | 6/2005 | Schindler et al. |
| 2005/0192387 | A1* | 9/2005 | Williams et al. ............... 524/261 |
| 2006/0210807 | A1 | 9/2006 | Miller |
| 2006/0270770 | A1 | 11/2006 | Feng et al. |
| 2007/0042199 | A1 | 2/2007 | Chisholm et al. |
| 2007/0129528 | A1 | 6/2007 | Huang et al. |
| 2008/0181862 | A1 | 7/2008 | Chisholm et al. |
| 2008/0213599 | A1 | 9/2008 | Webster et al. |
| 2010/0280148 | A1 | 11/2010 | Webster et al. |

FOREIGN PATENT DOCUMENTS

| | | |
|---|---|---|
| EP | 2157109 A1 | 2/2010 |
| JP | 1026534 A | 1/1989 |
| JP | 2007277377 A | 10/2007 |
| JP | 2008542476 A | 11/2008 |
| JP | 2010043178 A | 2/2010 |
| JP | 2010053157 A | 3/2010 |
| JP | 2011038013 A | 2/2011 |
| WO | 2007064621 A2 | 6/2007 |
| WO | 2009025924 A2 | 2/2009 |
| WO | 2009105625 A2 | 8/2009 |

OTHER PUBLICATIONS

Freeman (Silicones, Published for the Plastics Institute, ILIFFE Books, Ltd. (1962) p. 27).*
Extended European Search Report and Written Opinion issued in Application No. EP 12162837.4, dated Jul. 27, 2012.

* cited by examiner

*Primary Examiner* — Kuo-Liang Peng
(74) *Attorney, Agent, or Firm* — Cantor Colburn; Karl E. Stauss

(57) ABSTRACT

A two-package moisture curable composition is provided. The composition comprises a first part comprising at least one silane terminated polyurethane and a second part comprising at least one silanol terminated polysiloxane; wherein the silane terminated polyurethane based polymer has at least one end group of the general formula: —A—$(CH_2)_m$-$SiR^1_n$ $(OR^2)_{3-n}$, where A is a urethane or urea linkage group, $R^1$ is selected from $C_{1-12}$ alkyl, alkenyl, alkoxy, aminoalkyl, aryl and (meth)acryloxyalkyl groups, $R^2$ is each substituted or unsubstituted $C_{1-1-8}$ alkyl or $C_6$-$C_{20}$ aryl groups, m is an integer from 1 to 60 and n is an integer from 0 to 1; wherein the silane terminated polyurethane is prepared using natural oil polyols and their derivatives; and wherein the composition, after moisture cured, forms a surface whose water contact angle is larger than 101°. The composition is suitable for applications in antifouling coatings which afford low surface energy and improved mechanical performance.

16 Claims, No Drawings

TWO-COMPONENT MOISTURE CURABLE COATING COMPOSITIONS

BACKGROUND

This invention relates to two-part moisture curable coating compositions capable of forming polyurethane-polysiloxane-Si (PU-PDMS-Si) organic-inorganic hybrid networks having improved mechanical strength and excellent foul releasing property. The coating compositions are useful in the field of antifouling coating.

Biofouling occurs everywhere in the marine environment and is a significant problem for marine artificial objects. One approach to "shed" fouling microorganisms is using self-cleaning foul releasing coatings based on silicone elastomers. Polydimethylsiloxane (PDMS) based silicone elastomers foul releasing coatings have rubbery elasticity, very low surface energy and smooth surface. On these surfaces the adhesion strength of marine organisms is low and they detach from the coating surface under shear stress generated by hydrodynamic drag. However, PDMS is extremely soft, and does not have good damage tolerance. Since the silicone component easily wears off, the silicone rubber based antifouling coating requires frequent reapplications, which is very fussy, costly and time consuming.

One effective approach to improve the mechanical properties of PDMS based silicone coating is to blend PDMS with other polymers with better mechanical properties, such as polyurethane (PU). Polysiloxanes and polyurethanes possess very different, but highly useful, physical and mechanical properties which have led to their widespread use in countless applications. Polyurethanes stand out by virtues of mechanical strength, elasticity, adhesion resistance and abrasion resistance in the combination with polydimethylsiloxane in foul releasing coatings. However uniform physical blends of polysiloxanes and polyurethanes are very hard to be obtained, due to the highly incompatible properties of these resins and their pronounced tendency to undergo phase separation following their initial admixture. Silane terminated PU are already known in sealant, adhesive or binders' area. U.S. Pat. Appl. 2007/0129528 A1 describes a two-package system of polyurethane-polysiloxane resin mixture, where the first part contains a moisture-curable silylated polyurethane resin and a crosslinker for silanol-terminated diorganopolysiloxane, the second part contains silanol-terminated diorganopolysiloxane and a condensation catalyst. The resulting mixture exhibits uniform physical appearance, high elastic modulus, high tensile strength and high thermostability. However, the polyols disclosed to be utilized for the preparation of the silane terminated PU are polyether polyols, polyester polyols, polyetherester polyols and polyesterether polyols. In this system, cross-linked products of silylated PU prepolymer and silanol terminated polysiloxane have a variety of advantageous properties, but still have disadvantages especially in environmental durability over time, such as unsatisfactory UV resistance, oxidation resistance and alkali resistance. There is a desire to overcome these disadvantages and seek more cost effective and environmental benign raw materials in manufacture of the PU-PDMS-Si hybrid systems which are potentially used as foul releasing coatings.

The inventors surprisingly found that natural oils, an abundant renewable resource, can be successfully employed in the production of PU through the introduction of hydroxyl functional groups into the products which exhibit excellent mechanical properties such as compressive strength and elasticity and also excellent environmental durability. Moreover, the hydrophobic nature of the polymers produced from natural oil polyol (NOP) and their derivatives further provided excellent physical and chemical properties to the PU-PDMS-Si system. Novel moisture curable coating compositions derived from the PU-PDMS-Si system based on NOPs were found to have not only excellent mechanical properties, low surface energy and excellent foul-release properties, but also improved environmental durability performances such as UV resistance, oxidation resistance and alkali resistance. These advantageous properties enable the PU-PDMS-Si system to be extremely suitable for the application in the field of foul releasing coatings. The coating showed special surface morphology due to the phase separation of silylated PU and silanol PDMS. In this coating system, microphase separation occurring at the surface of the coating results in special surface structure. Domain size can be controlled by properly select silylated PU and silanol terminated polysiloxane with proper type and molecular weight. The coatings have well-defined surface structure and have been demonstrated to inhibit settlement of fouling organisms.

STATEMENT OF INVENTION

The present invention is directed to a two-part moisture curable composition comprising a first part comprising at least one silane terminated polyurethane and a second part comprising at least one silanol terminated polysiloxane; wherein the silane terminated polyurethane based polymer has at least one end group of the general formula: —A—$(CH_2)_m$—$SiR^1_n(OR^2)_{3-n}$, where A is a urethane or urea linkage group, $R^1$ is selected from $C_{1-12}$ alkyl, alkenyl, alkoxy, aminoalkyl, aryl and (meth)acryloxyalkyl groups, $R^2$ is each substituted or unsubstituted $C_{1-18}$ alkyl or $C_6$-$C_{20}$ aryl groups, m is an integer from 1 to 60 and n is an integer from 0 to 1; wherein the silane terminated polyurethane is prepared using natural oil polyols and their derivatives. At least one of the silanol terminated polysiloxanes has at least one Si—OH group. The composition, after being moisture cured, forms a surface whose water contact angle is larger than 101°.

DETAILED DESCRIPTION

The present invention provide a two-part moisture curable composition by introducing natural oil polyols and their derivatives into the preparation of a polyurethane-polysiloxane composition to achieve a more hydrophobic and more stable organic-inorganic hybrid network after the moisture curing process. With such a network, the coating film achieves not only lower surface energy and better mechanical properties but also excellent alkali and UV durability and oxidation resistance.

The two-part moisture curable composition of the present invention comprises a substantially non-water first part comprising at least one silane terminated polyurethane. The term "polyurethane" herein means a resin in which the polymer units are linked by urethane linkages, i.e., —O—CO—NH—, and/or one or more urea linkages, i.e., —NH—CO—NH—.

The silane terminated polyurethane may be prepared by reacting at least one isocyanate functionalized silane with one or more polyols, or reacting at least one isocyanate functionalized silane with one or more hydroxyl terminated prepolymers, or reacting at least one amino functionalized silane with one or more isocyanate terminated prepolymer(s). The prepolymers can be selected from the group consisting of polyurethanes, polyureas, polyethers, polyesters, poly(meth)acrylates, polycarbonates, polystyrenes, polyamines or polyamides, polyvinyl esters, styrene/butadiene copolymers, polyolefins, polysiloxanes, and polysiloxane-urea/urethane copolymers.

The silane terminated polyurethane of the present invention is essentially prepared using natural oil polyols and their derivatives. The natural oil polyol herein is a polyol having at least one or more hydroxyl groups per molecule, which is the reaction product of reactants (a) at least one polyester polyol or fatty acid derived polyol which is the reaction product of at least one initiator and a mixture of fatty acids or derivatives of fatty acids comprising at least about 45 weight percent monounsaturated fatty acids or derivatives thereof, and (b) optionally, at least one polyol which is different from the polyol of (a) and selected from polyester polyols, polyether polyols, polycarbonate polyols, acrylic polyols, polybutadiene polyols and polysiloxane polyols.

NOP is particularly suitable for this application due to its hydrophobic nature and good chemical resistance. Suitable NOPs include non-modified NOPs, such as, for example, natural seed oil diol monomers; and modified NOPs, such as, for example, commercially available Gen 1 NOP DWD 2080 form the Dow Chemical Company, which are reconstructed NOP molecules with the monomers of saturated, mono-hydroxyl, bi-hydroxyl and tri-hydroxyl methyl esters at a weight ratio of approximately 32%, 38%, 28% and 2%. In another example, a commercially available Gen 4 NOP is obtained by reacting Unoxol™ diol and seed oil diol monomers which are separated from seed oil monomer. The Gen 4 NOP has following structure with the hydroxyl equivalent weight of 170 g/mol.

In one embodiment, the natural oil based polyols are obtained by a multi-step process wherein the animal or vegetable oils/fats are subjected to transesterification and the constituent fatty acid esters are recovered. This step is followed by reductive hydroformylations of carbon-carbon double bonds in the constituent fatty acid esters to form hydroxymethyl groups, and then forming a polyester or polyether/polyester by reaction of the hydroxymethylated fatty acid esters with an appropriate initiator compound. The multistep process results in the production of a polyol with at least a hydrophobic moiety.

The initiator for use in the multi-step process for the production of the natural oil based polyols may be any initiator used in the production of conventional petroleum-based polyols. The initiator may, for example, be selected from the group consisting of 1,3 cyclohexane dimethanol; 1,4 cyclohexane dimethanol; neopentylglycol; 1,2-propylene glycol trimethylolpropane; pentaerythritol; sorbitol; sucrose; glycerol; diethanolamine; alkanediols such as 1,6-hexanediol, 1,4-butanediol; 1,4-cyclohexane diol; 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis(hydroxymethyl)tricycle decene; Dimerol alcohol (36 carbon diol available from Henkel Corporation); hydrogenated bisphenol; 9,9(10,10)-bishydroxymethyloctadecanol; 1,2,6-hexanetriol and combinations thereof. In the alternative, the initiator may be selected from the group consisting of glycerol; ethylene glycol; 1,2-propylene glycol; trimethylolpropane; ethylene diamine; pentaerythritol; dieth-

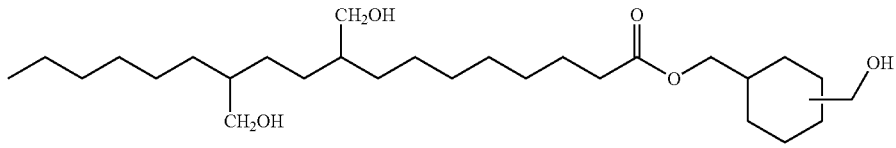

The natural oil derived polyols are polyols based on or derived from renewable feedstock resources such as natural and/or genetically modified plant vegetable seed oils and/or animal source fats. Such oils and/or fats are generally comprised of triglycerides, that is, fatty acids linked together with glycerol. Preferred are vegetable oils that have at least about 70 percent unsaturated fatty acids in the triglyceride. The natural product may contain at least about 85 percent by weight unsaturated fatty acids. Examples of preferred vegetable oils include, but are not limited to, for example, those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination thereof.

Additionally, oils obtained from organisms such as algae may also be used. Examples of animal products include lard, beef tallow, fish oils and mixtures thereof. A combination of vegetable and animal based oils/fats may also be used.

Several chemistries can be used to prepare the natural oil based polyols. Such modifications of a renewable resource include, but are not limited to, for example, epoxidation, hydroxylation, ozonolysis, esterification, hydroformylation, or alkoxylation. Such modifications are commonly known in the art.

ylene triamine; sorbitol; sucrose; or any of the aforementioned where at least one of the alcohol or amine groups present therein has been reacted with ethylene oxide, propylene oxide or mixtures thereof; and combinations thereof. In another alternative, the initiator is glycerol, trimethylopropane, pentaerythritol, sucrose, sorbitol, and/or mixtures thereof.

In one embodiment, the initiators are alkoxlyated with ethylene oxide or a mixture of ethylene oxide and at least one other alkylene oxide to give an alkoxylated initiator with a molecular weight between 100 and 500.

The average hydroxyl functionality of the at least one natural oil based polyol is in the range of from 1 to 10; or in the alternative, in the range of from 2 to 6.

The natural oil based polyol may have a number average molecular weight in the range of from 100 to 3,000; for example, from 300 to 2,000; or in the alternative, from 350 to 1,500.

The NOP of the present invention may be a blend with any of the following: aliphatic and aromatic polyester polyols including caprolactone based polyester polyols, any polyester/polyether hybrid polyols, poly(tetrmethylene ether glycol) PTMEG based polyether polyols; polyether polyols based on ethylene oxide, propylene oxide, butylene oxide and mixtures thereof; polycarbonate polyols; polyacetal polyols, polyacrylate polyols; polyesteramide polyols; polythioether polyols; polyolefin polyols such as saturated or unsaturated polybutadiene polyols.

The composition of the present invention made from the natural oil based polyols may possess hydrophobic properties due to the hydrophobicity of the backbone of the polyols, which is important to the intrinsic corrosion resistance of the coating. The inventive NOP compositions are saturated hydrocarbon polymer chains that prevent incursion of aqueous media. Therefore, the inventive NOP based coatings provide superior alkali, water and UV resistance.

The silane terminated polyurethane may be prepared by the reaction of NOP with isocyanate functionalized silane. In addition, isocyanate or hydroxyl terminated prepolymer resulting from the reaction of NOP and diisocyanate may be employed to replace the NOP polyol, and isocyanate functionalized silane or amino-functionalized silane can be employed according to the terminal groups of the prepolymer. If the prepolymer was terminated with isocyanate group, the amino-terminated silane will be employed. If the prepolymer was terminated with hydroxyl group, the isocyanate functionalized silane will be employed Examples of suitable diisocyanates include such as, for example, 1,4-tetramethylene diisocyanate, 1,6-hexamethylene diisocyanate, 1,10-decamethylene diisocyanate, 1,4-cyclohexane diisocyanate, m- and p-phenylene diisocyanate, 2,6- and 2,4-tolyene diisocyanate, xylene diisocyanate, 4-chloro-1,3-phenylene diisocyanate, 4,4'-bisphenylene diisocyanate, 4,4'-methylene diphenylisocyante, 1,5-naphthylene diisocyanate, 1,5-tetrahydronaphthylene diisocyanate, 1,12-dodecyldiisocyanate, norbornate diisocyanate, 2-methyl-1,5-pentane diisocyanate and mixtures thereof.

Examples of suitable amino-terminated silanes include such as, for example, 3-aminopropyltriethoxy silane, 3-aminopropyldimethylethoxy silane, 3-amiopropylmethyldiethoxy silane, 3-aminopropyltrimethoxy silane and mixtures thereof.

Useful silylation reactants for the hydroxyl-terminated prepolymer resins are those containing isocyanate termination and readily hydrolizable functionality, e.g., 1 to 3 alkoxy groups. Suitable isocyanate-terminated silanes include, but are not limited to, isocyanatopropyl triethoxysilane, isocyanatopropyl triemethoxysilane, isocyanatomethyl methyldiethoxysilane, isocyanatomethyl methyldimethoxysilane and mixtures thereof.

The silylated polymers have silane group at the end of the molecular chain. The end group of silylated polymers can have the general formula:

—A—(CH$_2$)$_m$—SiR$^1_n$(OR$^2$)$_{3-n}$, where A is a functional linkage group, for example, including but not limited, urethane or urea group. R$^1$ may be a C$_{1-12}$ alkyl, alkenyl, alkoxy, aminoalkyl or aryl group or a (meth)acryloxyalkyl group. R$^2$ is each substituted or unsubstitured C$_{1-18}$ alkyl or C$_6$-C$_{20}$ aryl groups. m is an integer from 1 to 60. n is an integer from 0 to 1. The content of the silane terminated polyurethane in the moisture curable composition is, by weight percentage based on the dry weight of the composition, from 10 to 99%, alternatively from 70 to 95%, alternatively from 70 to 90%, alternatively from 85 to 90%, or alternatively from 85 to 95%.

Preferably, the silane terminated polyurethane has a number average molecular weight in the range of from 500 to 100,000, more preferably from 800 to 50,000.

The substantially non-water first part may comprises, in addition to the moisture-curable silylated polyurethane resin, at least one crosslinker for the crosslinking of silanol-terminated diorganopolysiloxane.

The crosslinker component in the first part of the curable composition is one which is effective for the crosslinking of silanol terminated polysiloxane, the latter being a component of the second part of the curable composition. In one embodiment, the crosslinker is an alkylsilicate of the general formula:

R$^{12}$(R$^{13}$O)(R$^{14}$O)(R$^{15}$O)Si wherein R$^{12}$ is chosen from each substituted or unsubstituted C$_1$ to C$_{60}$ hydrocarbon radicals or alkoxyl group, R$^{13}$, R$^{14}$ and R$^{15}$ are independently each substituted or unsubstituted C$_{1-18}$ alkyl or C$_6$-C$_{20}$ aryl groups.

Crosslinkers useful herein include tetra-N-propylsilicate (NPS), tetraethylorthosilicate, methytrimethoxysilane and similar alkyl substituted alkoxysilane compositions.

The two-part moisture curable composition of the present invention comprises a substantially non-water second part comprising silanol terminated polysiloxane which has the formula

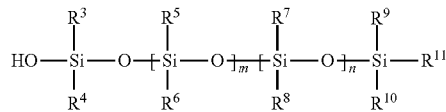

where R$^5$, R$^6$, R$^7$ and R$^8$ groups are independently chosen from monovalent C$_1$ to C$_{60}$ hydrocarbon radicals optionally substituted by fluorine or chlorine, R$^3$, R$^4$, R$^9$, R$^{10}$ and R$^{11}$ groups are independently chosen from hydroxyl group or each substituted or unsubstituted C$_1$ to C$_{60}$ hydrocarbon radicals, each of m and n is independently an integer from 0 to 1,500, and m+n≥2.

The foregoing silane terminated polysiloxane polymer and their crosslinking with alkylsilicate crosslinkers such as those described above are disclosed in further detail in published US. Pat. Appl. 2005/0192387. Specific silane terminated polysiloxane includes the commercial available products with terminal Si—OH group, such as, for example, PDMS with the below structure

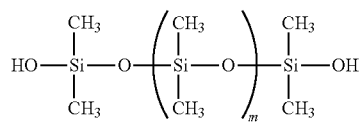

Preferably, the silanol terminated polysiloxane has a number average molecular weight in the range of from 500 to 200,000, more preferably from 1,000 to 50,000.

The two-part moisture curable composition of the present invention comprises a condensation catalyst in the first and/or second part.

The inventors believe that additional components can be optionally incorporated into the first part and/or second part, whichever part(s) the component is compatible therewith, without substantially affecting properties. The additional components include, for example, filler, UV stabilizer, antioxidant, adhesion promoter, cure accelerator, thixotropic agent, plasticizer, moisture scavenger, pigment, dye, surfactant, solvent and biocide.

For the hydrophobic foul releasing surface, hydrophobic agents conventionally used in the art are optionally used in at least one part of the two-part composition. Suitable hydrophobic agents include: Si-based hydrophobic agents such as siloxane, silane, silicone, polydimethylsiloxane (as an additive); flouro-based hydrophobic agents such as fluorosilanes, fluoroalkyl silanes, polytetrafluoroethylene, polytrifluoroethylene, polyvinylfluoride, or functional fluoroalkyl compounds; and hydrocarbon hydrophobic agents such as reactive wax, polyethylene, or polypropylene.

The novel two-package moisture curable foul releasing compositions are capable of self-crosslinking in moisture condition under room temperature to form an organic-inorganic hybrid network and suitable for the application in marine paints with improved mechanical durability and excellent fou releasing performance. After hydrolysis and co-condensation between Si—OR of silane terminated polyurethane and Si—OH group of silanol terminated polysiloxane, the coating composition can be cross-linked.

The formation of Si—O—Si bonding between silylated polyurethane and silanol polysiloxane improves physical properties such as foul releasing performance and mechanical durability, and the easy moisture curing process greatly facilitates practical application process, especially for those large surfaces which are difficult to heat-treat in thermoset coatings.

PDMS, while the surrounding material consists of silylated PU containing little or no PDMS.

The antifouling coating composition, in addition to the silane terminated polyurethane and the silanol terminated polysiloxane of the moisture curable composition described herein, may also contain one or more additional polymeric binders such as, for example, epoxy and acrylic polymer.

In the present specification, the technical features in each preferred technical solution and more preferred technical solution can be combined with each other to form new technical solutions unless indicated otherwise. For brevity, the applicant omits descriptions of these combinations. However, all the technical solutions obtained by combining these technical features should be deemed as being literally described in the present specification in an explicit manner.

EXAMPLES

1. Raw Materials

| Material used in the antifouling marine coatings | | | |
|---|---|---|---|
| Material | Function | Chemical nature | Supplier |
| IPTES | Silane | Isocyanatopropyl triethoxysilane | TCI |
| APTES | Silane | 3-aminopropyltriethoxysilane | Adrich |
| DBTDL | Catalyst | dibutyltin dilaurate | Sinopharm Chemical Reagent Company |
| p-toluenesulfonic acid | Catalyst | p-toluenesulfonic acid | Sinopharm Chemical Reagent Company |
| HDI | di-isocyanate | 1,6-hexamethylene diisocyanate propanol | TCI |
| DWD 2080 | NOP polyol | Gen 1 NOP with EHW = 425 g/mol and Fn = 2 | Dow Chemical |
| NOP 1 | NOP polyol | Gen 4 NOP with EHW = 170 g/mol and Fn = 3 | Dow Chemical |
| NOP2 | NOP polyol | Gen 4 NOP with EHW = 710 g/mol and Fn = 3 | Dow Chemical |
| NOP3 | NOP polyol | Gen 4 NOP with EHW = 350 g/mol and Fn = 2.4 | Dow Chemical |
| VORANOL ™ WD 2104 | Polyether polyol | Polyether polyol | Dow Chemical |
| VORANOL ™ CP 1055 | Polyether polyol | Polyether polyol | Dow Chemical |
| Capa 3050 | Polyester polyol | Polyester polyol | PERSTORP UK Limited |
| X-21-5841 | Silanol PDMS | Silanol PDMS | Shin-Estu |
| XIAMETER ™ PMX-0156 | Silanol PDMS | Silanol PDMS | Dow corning |
| CRTV942 | Silanol PDMS | Silanol PDMS | Momentive |
| Butyl acetate | Solvent | Butyl acetate | Eastman |

The hydrophobic nature of the NOP further provides excellent durability properties including UV resistance, oxidation resistance and alkali resistance. In the meantime, the NOP based PU-PDMS-Si coating exhibits the same low surface energy and excellent foulreleasing properties as conventional non-NOP polyols based PU-PDMS-Si systems.

The defined surface morphology is the complicated surface structure with the microphase separation of different polymer domains. In one embodiment, the polymer domains are silylated PU and silanol PDMS phase. Two domains show different surface energy. One domain with significantly lower surface energy were primarily composed of silylatedsilynol 2. Test Procedures Pseudo-Barnacle Pull Off Strength Test The test was carried out according to a modified procedure as described in reference (Kohl J G& Singer I L, Pull-off behavior of epoxy bonded to silicone duplex coatings, Progress in Organic Coatings, 1999, 36:15-20) using an Elcometer™ pull off strength tester.

Ten-millimeter diameter aluminum studs were designed specially for the Elcometer™ instrument. The epoxy adhesive (Araldite™ resin) was used to glue the studs to the surface of the coated panels. The excessive epoxy was trimmed after about one hour cure. The epoxy adhesive was then allowed to harden for three days at room temperature. The stud was then pulled off by the Elcometer™ instrument till the stud detached from the coating surface. For each test, at least three replicate samples were employed and the average value for pull off strength (MPa) was recorded. If the pseudo-barnacle pull off strength is lower than 0.5 MPa, it indicates that the coating has good foul-release property.

Alkali Resistance Test

The test was carried out according to a modified procedure as described below. It tests the ability of the coatings to resist the effects of aqueous alkaline solutions. The coatings were immersed in a 1.0 M NaOH aqueous solution for 24 hours. After the immersion, the appearance of the coatings was evaluated with the naked eye. The alkali resistance was rated "G (good)" when neither change of appearance nor peeling of the resist film was observed or "NG (no good)" when lifting and/or peeling/and or yellowing of the resist film was observed.

Quick Ultra Violet (QUV) Test

The coatings were exposed to 168 hours of accelerated aging in a QUV weatherometer in accordance with the standard QUV exposure test procedure. The results of all of the tests are shown in Table 1 (N/A means no QUV experiment on this sample).

EXAMPLE 1

Synthesis Procedure 17 g of Gen 4 polyol with hydroxyl equivalent weight of 170 g/mol (Dow Chemical) was introduced into a 250 mL round bottom flask equipped with a mechanical stirrer. 25 g of isocyanatopropyl triethoxysilane IPTES and 18 g butyl acetate were added into the round bottom flask. The mixture was stirred at 75° C. under nitrogen protection. 0.1 wt. % of catalyst DBTDL was added. The reaction was allowed to proceed until complete disappearance of isocyanate functional groups which can be confirmed by IR analysis. 5 g of silane functionalized polyurethane solution (70% solids) was mixed with 0.35 g silanol terminated PDMS (XIAMETER™ PMX-0156, Dow Coring). 0.1 wt. % DBTDL and 0.2 wt % p-toluenesulfonic acid was added. The solution was then mixed for 20 minutes. The thoroughly mixed solution was removed form the mixer and allowed to stay static for 2-5 minutes to remove most of the gas bubbles. The above formulation was coated using blade coater on an aluminum panel. A wet coating with the thickness of 300 μm was applied to clean aluminum panels. The coated panels were allowed to dry at room temperature for at least 2 days prior to contact angle measurements and pseudo-barnacle pull off strength test. A coating surface with good foul releasing property typically exhibits static contact angles equal to or higher than 101°. The pseudo-barnacle pull off test indicated that a coating surface with good foul releasing property typically exhibits pseudo-barnacle pull off strength lower than 0.5 MPa.

The formulations of the moisture curable PU-PDMS-Si coatings were listed in Table 1. In all formulations, IPTES was used as functionalized silane to terminate the NOP and PDMS PMX-0156 was employed as silanol PDMS in the formulation.

TABLE 1

Formulation and performance tests of coating samples

| Coating Sample | polyol | Silylated PU (solid wt %) | PDMS | PDMS (solid wt %) | Contact angle (°) | Pseudo-barnacle pull off strength (MPa) | Alkali resistance | 168 hour QUV exposure |
|---|---|---|---|---|---|---|---|---|
| 1 | NOP1 | 90 | PMX-0156 | 10 | 108 | 0.2 | G | [a]ΔE = 0.23 |
| 2 | NOP1 | 95 | PMX-0156 | 5 | 105 | 0.3 | G | N/A |
| 3 | NOP1 | 97 | PMX-0156 | 3 | 105 | 0.3 | G | N/A |
| 4 | NOP1 | 80 | PMX-0156 | 20 | 108 | 0.2 | G | N/A |
| 5 | NOP1 | 70 | PMX-0156 | 30 | 109 | 0.3 | G | N/A |
| 6 | NOP1 | 40 | PMX-0156 | 60 | 104 | 0.3-0.4 | G | N/A |
| 7 | NOP2 | 90 | PMX-0156 | 10 | 107 | 0.3 | G | [b]ΔE = 0.45 |
| 8 | NOP3 | 90 | PMX-0156 | 10 | 108 | 0.2 | G | N/A |
| 9 | DWD 2080 | 90 | PMX-0156 | 10 | 108 | 0.2 | G | N/A |
| 10 | NOP1 | 90 | CRTV 942 | 10 | 109 | 0.2 | G | N/A |
| Comp. Sample 1 | WD 2104 | 90 | PMX-0156 | 10 | 104 | 0.3 | NG | [c]ΔE = 9.19 |
| Comp. Sample 2 | CP 1055 | 90 | PMX-0156 | 10 | 105 | 0.3 | NG | N/A |
| Comp. Sample 3 | Capa 3050 | 90 | PMX-0156 | 10 | 106 | 0.3 | NG | [c]ΔE = 9.58 |

[a]The color basically does not change, no chalking
[b]The color basically does not change, no chalking
[c]The color turns yellow, no chalking
[d]The color turns yellow, no chalking

EXAMPLE 2

Preparation of Silane Terminated Polybutadiene Based Polyurethane Polymer

A reaction was carried out between NOP and an excess of diisocyanate with mol ratio of NCO/OH=2. The isocyanate terminated polyurethane prepolymers were reacted with amino functionalized silane and NOP based silane terminated polyurethane polymers were obtained.

4.25 g of DWD 2080 was introduced to a 50 ml round bottom flask equipped with a mechanical stirrer. 1.68 g 1,6-hexamethylene diisocyanate was added into the round bottom flask. 0.1 wt % of catalyst DBTDL was added. The mixture was stirred at 75° C. under nitrogen protection for 1 hour. After the mixture was cooled to room temperature, 2.75 g butyl acetate and 2.2 g 3-aminopropyltriethoxysilane were carefully added into the flask without contacting with air. The reaction was allowed to proceed until complete disappearance of isocyanate functions, which was confirmed by IR analysis. The resulting sample was transparent and stable at room temperature. 5 g of silane functionalized polyurethane solution (60% solids) was mixed with 0.35 g silanol terminated PDMS (XIAMETER™ PMX-0156). 0.1 wt. % DBTDL and 0.2_ wt % p-toluenesulfonic acid was added. The coating was prepared as Example 1. The resulted contact angle and the pseudo-barnacle pull off strength of the coating were 109° and 0.2 MPa, respectively.

EXAMPLE 3

The same as Example 2 except the mole ratio of NOP and diisocyanate was changed to NCO/OH=0.5. The silylation process was carried out by reacting isocyanatopropyl triethoxysilane with hydroxyl terminated PU prepolymer. The coating was prepared as Example 2. The resulted contact angle and the pseudo-barnacle pull off strength of the coating were 107° and 0.3 MPa, respectively.

The invention claimed is:

1. A two-part moisture curable composition comprising a first part comprising at least one silane terminated polyurethane prepared from at least one natural oil polyol, and a second part comprising at least one silanol terminated polysiloxane; wherein the composition, after being moisture cured, forms a surface whose water contact angle is larger than 101°.

2. The composition of claim 1, wherein the silane terminated polyurethane comprises at least one end group of the general formula

where A is a urethane or urea linkage group, $R^1$ is selected from $C_{1-12}$ alkyl, alkenyl, alkoxy, aminoalkyl, aryl and (meth) acryloxyalkyl groups, $R^2$ is each substituted or unsubstituted $C_{1-18}$ alkyl or $C_6$-$C_{20}$ aryl groups, m is an integer from 1 to 60 and n is an integer from 0 to 1.

3. The composition of claim 1, wherein the silane terminated polyurethane is prepared by reacting at least one isocyanate functionalized silane with the at least one natural oil polyol; or reacting at least one isocyanate functionalized silane with one or more hydroxy terminated polyurethane prepolymer(s) derived from a natural oil polyol; or reacting at least one amino functionalized silane with one or more isocyante terminated polyurethane prepolymer(s) derived from a natural oil polyol.

4. The composition of claim 1, wherein the silanol terminated polysiloxane has the formula

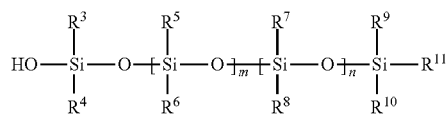

where $R^5$, $R^6$, $R^7$ and $R^8$ groups are independently chosen from monovalent $C_1$ to $C_{60}$ hydrocarbon radicals optionally substituted by fluorine or chlorine, $R^3$, $R^4$, $R^9$, $R^{10}$ and $R^{11}$ groups are independently chosen from hydroxyl group or each substituted or unsubstituted $C_1$ to $C_{60}$ hydrocarbon radicals, each of m and n is independently an integer from 0 to 1,500, and m+n≥2.

5. The composition of claim 1, wherein the amount of the silane terminated polyurethane ranges from 10 to 99 wt %, and the amount of the silanol terminated polysiloxane ranges from 1 to 90 wt %, based on the total dry weight of the two-part composition.

6. The composition of claim 5, wherein the amount of the silane terminated polyurethane ranges from 70 to 95 wt %, and the amount of the silanol terminated polysiloxane ranges from 5 to 30 wt %, based on the total dry weight of the two-part composition.

7. The composition of claim 1, wherein the silane terminated polyurethane has a number average molecular weight in the range of from 500 to 100,000, and the silanol terminated polysiloxane has a number average molecular weight in the range of from 500 to 200,000.

8. The composition of claim 7, wherein the silane terminated polyurethane has an number average weight in the range of 800 to 5000.

9. The composition of claim 1, wherein the first part of the composition further comprises one or more crosslinkers.

10. A method of coating a substrate comprising the steps of mixing the first and second parts of the composition of claim 1, applying the mixture to the substrate and exposing to moisture to initiate cure of the composition.

11. A coating film derived from the composition of claim 1.

12. An antifouling coating derived from the moisture curable composition of claim 1.

13. The composition of claim 1, wherein the at least one natural oil polyol is prepared by a method comprising:
   transesterification of animal or vegetable oils and/or fats;
   recovery of constituent fatty acid esters;
   hydroformylation of carbon-carbon double bonds in the constituent fatty acid esters to form hydroxymethylated fatty acid esters; and
   reaction of the hydroxymethylated fatty acid esters with an initiator.

14. The composition of claim 13, wherein the initiator comprises a mixture of cis, trans-1,4-cyclohexane dimethanol and cis, trans-1,3-cyclohexane dimethanol.

15. The composition of claim 1, wherein the natural oil polyol comprises a triol of structure:

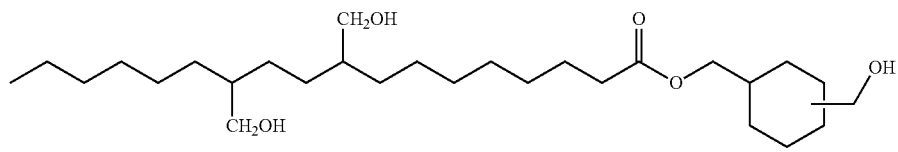
16. The composition of claim 1, wherein the composition, after being moisture cured, forms a surface whose water contact angle is larger than 101° and less than or equal to 109° C.
* * * * *